United States Patent
Xiong et al.

(10) Patent No.: US 12,232,123 B2
(45) Date of Patent: Feb. 18, 2025

(54) GENERATION NODE B (GNB) CONFIGURED FOR SLOT-LESS OPERATION AT FREQUENCIES ABOVE A 52.6 GHz CARRIER FREQUENCY

(71) Applicant: Intel Corporation, Santa Clara, CA (US)

(72) Inventors: Gang Xiong, Beaverton, OR (US); Avik Sengupta, San Jose, CA (US); Alexei Davydov, Nizhny Novgorod (RU); Dae Won Lee, Portland, OR (US); Yingyang Li, Beijing (CN); Salvatore Talarico, Los Gatos, CA (US)

(73) Assignee: Intel Corporation, Santa Clara, CA (US)

( * ) Notice: Subject to any disclaimer, the term of this patent is extended or adjusted under 35 U.S.C. 154(b) by 472 days.

(21) Appl. No.: 17/242,560

(22) Filed: Apr. 28, 2021

(65) Prior Publication Data

US 2021/0250977 A1    Aug. 12, 2021

Related U.S. Application Data

(60) Provisional application No. 63/051,485, filed on Jul. 14, 2020, provisional application No. 63/036,770, (Continued)

(51) Int. Cl.
*H04W 72/23* (2023.01)
*H04L 5/00* (2006.01)
(Continued)

(52) U.S. Cl.
CPC .......... *H04W 72/23* (2023.01); *H04L 5/0051* (2013.01); *H04W 72/0446* (2013.01);
(Continued)

(58) Field of Classification Search
CPC ............ H04W 72/23; H04W 72/0446; H04W 72/0453; H04W 72/1273; H04W 72/535;
(Continued)

(56) References Cited

U.S. PATENT DOCUMENTS

| | | | |
|---|---|---|---|
| 2019/0110290 A1* | 4/2019 | Sun ........................ | H04W 24/08 |
| 2019/0387506 A1* | 12/2019 | Ugurlu .................. | H04L 5/0091 |
| 2020/0052846 A1* | 2/2020 | Takeda .................. | H04L 5/0048 |
| 2021/0022044 A1* | 1/2021 | Zhang ................... | H04W 28/20 |

(Continued)

OTHER PUBLICATIONS

Cheng et al., "Multi-Numberology Frame Structure for NR operation in MM-WAVE Frequency Bands", U.S. Appl. No. 62/989,294, filed Mar. 13, 2020 (Year: 2020).*

(Continued)

*Primary Examiner* — Thinh D Tran
(74) *Attorney, Agent, or Firm* — Schwegman Lundberg & Woessner, P.A.

(57) ABSTRACT

A generation node B (gNB) for a fifth-generation (5G) new radio (NR) or a sixth-generation (6G) network is configured for slot-less operation at frequencies above a 52.6 GHz carrier frequency. The gNB may generate signalling to configure a user equipment (UE) with a gap between demodulation reference signal (DMRS) symbols for an associated physical downlink shared channel (PDSCH). The gNB may also encode the DMRS symbols for transmission in accordance with the gap and may encode the associated PDSCH for transmission during the gap between the DMRS symbol transmissions at symbol times following the DMRS symbols.

14 Claims, 7 Drawing Sheets

Related U.S. Application Data filed on Jun. 9, 2020, provisional application No. 63/019,837, filed on May 4, 2020.

(51) Int. Cl.
  *H04W 72/0446* (2023.01)
  *H04W 72/0453* (2023.01)
  *H04W 72/1273* (2023.01)
  *H04W 72/50* (2023.01)

(52) U.S. Cl.
  CPC ... *H04W 72/0453* (2013.01); *H04W 72/1273* (2013.01); *H04W 72/535* (2023.01)

(58) Field of Classification Search
  CPC ... H04L 5/0051; H04L 27/2613; H04L 5/001; H04L 5/0012; H04L 5/0026; H04L 5/0048; H04L 5/0053; H04L 5/0091; H04L 27/2035
  See application file for complete search history.

(56) References Cited

U.S. PATENT DOCUMENTS

| | | | |
|---|---|---|---|
| 2021/0091915 A1* | 3/2021 | Khoshnevisan | H04L 5/0094 |
| 2021/0203451 A1* | 7/2021 | Lei | H04L 1/1854 |
| 2021/0385804 A1* | 12/2021 | Ye | H04W 72/20 |
| 2022/0053523 A1* | 2/2022 | Jia | H04W 72/0453 |
| 2022/0085939 A1* | 3/2022 | Mondal | H04L 5/0048 |
| 2022/0174736 A1* | 6/2022 | Oviedo | H04L 5/0053 |
| 2022/0321272 A1* | 10/2022 | Yoshioka | H04L 1/1812 |
| 2023/0101410 A1* | 3/2023 | Cheng | H04L 27/26025 |
| | | | 375/262 |

OTHER PUBLICATIONS

Zhang et al., "Multiplexing with a single carrier waveform", U.S. Appl. No. 62/876,448, filed Jul. 19, 2019 (Year: 2019).*
"3GPP TS 38.211 V16.2.0", 3rd Generation Partnership Project;Technical Specification Group Radio Access Network;NR;Physical channels and modulation(Release 16), (Jun. 2020), 131 pgs.

* cited by examiner

GENERATION NODE B (GNB) CONFIGURED FOR SLOT-LESS OPERATION AT FREQUENCIES ABOVE A 52.6 GHz CARRIER FREQUENCY

PRIORITY CLAIMS

This application claims priority under 35 USC 119(e) to U.S. Provisional Patent Application Ser. No. 63/019,837, filed May 4, 2020, U.S. Provisional Patent Application Ser. No. 63/036,770, filed Jun. 9, 2020, and U.S. Provisional Patent Application Ser. No. 63/051,485, filed Jul. 14, 2020, which are incorporated herein by reference in their entireties.

TECHNICAL FIELD

Embodiments pertain to wireless communications. Some embodiments relate to communicating in a fifth-generation (5G) new radio (NR) system. Some embodiments related to a sixth-generation (6G) network. Some embodiments relate to slot-less operation. Some embodiments relate to operations at frequencies above a 52.6 GHz carrier frequency. Some embodiments relate to reference signal generation for slot-less operation.

BACKGROUND

Mobile communication has evolved significantly from early voice systems to today's highly sophisticated integrated communication platform. The next generation wireless communication system, 5G, or new radio (NR) will provide access to information and sharing of data anywhere, anytime by various users and applications. NR is expected to be a unified network/system that target to meet vastly different and sometime conflicting performance dimensions and services. Such diverse multi-dimensional requirements are driven by different services and applications. In general, NR will evolve based on 3GPP LTE-Advanced with additional potential new Radio Access Technologies (RATs) to enrich people lives with better, simple and seamless wireless connectivity solutions. NR will enable everything connected by wireless and deliver fast, rich contents and services.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Some embodiments are directed to a generation node B (gNB) for a fifth-generation (5G) new radio (NR) network is configured for slot-less operation at frequencies above a 52.6 GHz carrier frequency. The gNB may generate signalling to configure a user equipment (UE) with a gap between demodulation reference signal (DMRS) symbols for an associated physical downlink shared channel (PDSCH). The gNB may also encode the DMRS symbols for transmission in accordance with the gap and may encode the associated PDSCH for transmission during the gap between the DMRS symbol transmissions at symbol times following the DMRS symbols. Some embodiments are directed to a UE configured for slot-less operations.

Figure 1A:
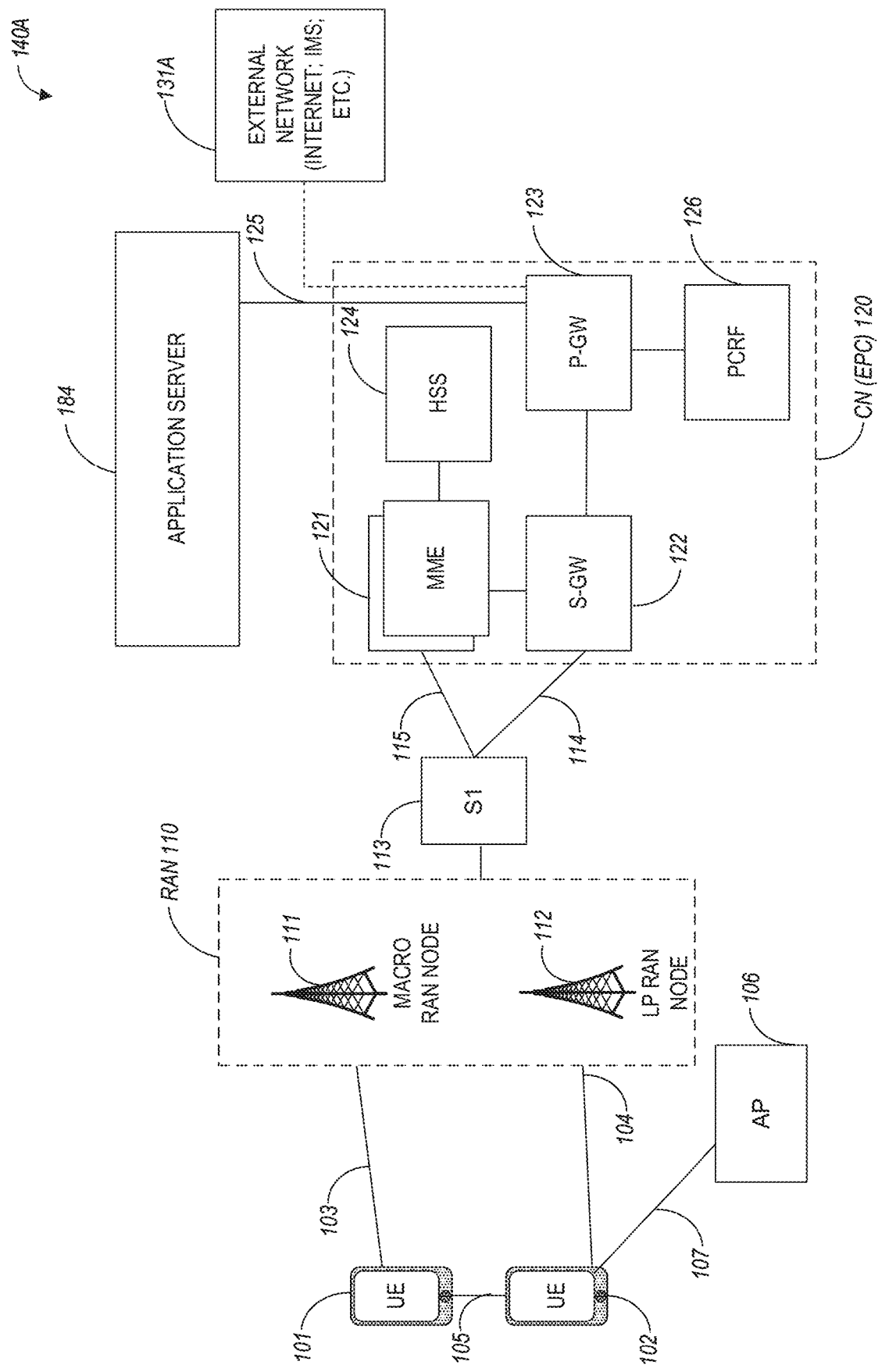
FIG. 1A illustrates an architecture of a network, in accordance with some embodiments.

FIG. 1A illustrates an architecture of a network in accordance with some embodiments. The network 140A is shown to include user equipment (UE) 101 and UE 102. The UEs 101 and 102 are illustrated as smartphones (e.g., handheld touchscreen mobile computing devices connectable to one or more cellular networks) but may also include any mobile or non-mobile computing device, such as Personal Data Assistants (PDAs), pagers, laptop computers, desktop computers, wireless handsets, drones, or any other computing device including a wired and/or wireless communications interface. The UEs 101 and 102 can be collectively referred to herein as UE 101, and UE 101 can be used to perform one or more of the techniques disclosed herein.

Any of the radio links described herein (e.g., as used in the network 140A or any other illustrated network) may operate according to any exemplary radio communication technology and/or standard.

LTE and LTE-Advanced are standards for wireless communications of high-speed data for UE such as mobile telephones. In LTE-Advanced and various wireless systems, carrier aggregation is a technology according to which multiple carrier signals operating on different frequencies may be used to carry communications for a single UE, thus increasing the bandwidth available to a single device. In some embodiments, carrier aggregation may be used where one or more component carriers operate on unlicensed frequencies.

Embodiments described herein can be used in the context of any spectrum management scheme including, for example, dedicated licensed spectrum, unlicensed spectrum, (licensed) shared spectrum (such as Licensed Shared Access (LSA) in 2.3-2.4 GHz, 3.4-3.6 GHz, 3.6-3.8 GHz, and further frequencies and Spectrum Access System (SAS) in 3.55-3.7 GHz and further frequencies).

Embodiments described herein can also be applied to different Single Carrier or OFDM flavors (CP-OFDM, SC-FDMA, SC-OFDM, filter bank-based multicarrier (FBMC), OFDMA, etc.) and in particular 3GPP NR (New Radio) by allocating the OFDM carrier data bit vectors to the corresponding symbol resources.

In some embodiments, any of the UEs 101 and 102 can comprise an Internet-of-Things (IoT) UE or a Cellular IoT (CIoT) UE, which can comprise a network access layer designed for low-power IoT applications utilizing short-lived UE connections. In some embodiments, any of the UEs 101 and 102 can include a narrowband (NB) IoT UE (e.g., such as an enhanced NB-IoT (eNB-IoT) UE and Further Enhanced (FeNB-IoT) UE). An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network includes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

In some embodiments, any of the UEs 101 and 102 can include enhanced MTC (eMTC) UEs or further enhanced MTC (FeMTC) UEs.

The UEs 101 and 102 may be configured to connect, e.g., communicatively couple, with a radio access network (RAN) 110. The RAN 110 may be, for example, an Evolved Universal Mobile Telecommunications System (UMTS) Terrestrial Radio Access Network (E-UTRAN), a NextGen RAN (NG RAN), or some other type of RAN. The UEs 101 and 102 utilize connections 103 and 104, respectively, each of which comprises a physical communications interface or layer (discussed in further detail below); in this example, the connections 103 and 104 are illustrated as an air interface to enable communicative coupling and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth-generation (5G) protocol, a New Radio (NR) protocol, and the like.

In an aspect, the UEs 101 and 102 may further directly exchange communication data via a ProSe interface 105. The ProSe interface 105 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 102 is shown to be configured to access an access point (AP) 106 via connection 107. The connection 107 can comprise a local wireless connection, such as, for example, a connection consistent with any IEEE 802.11 protocol, according to which the AP 106 can comprise a wireless fidelity (WiFi®) router. In this example, the AP 106 is shown to be connected to the Internet without connecting to the core network of the wireless system (described in further detail below).

The RAN 110 can include one or more access nodes that enable the connections 103 and 104. These access nodes (ANs) can be referred to as base stations (BSs), NodeBs, evolved NodeBs (eNBs), Next Generation NodeBs (gNBs), RAN nodes, and the like, and can comprise ground stations (e.g., terrestrial access points) or satellite stations providing coverage within a geographic area (e.g., a cell). In some embodiments, the communication nodes 111 and 112 can be transmission/reception points (TRPs). In instances when the communication nodes 111 and 112 are NodeBs (e.g., eNBs or gNBs), one or more TRPs can function within the communication cell of the NodeBs. The RAN 110 may include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some embodiments, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management. In an example, any of the nodes 111 and/or 112 can be a new generation Node-B (gNB), an evolved node-B (eNB), or another type of RAN node.

The RAN 110 is shown to be communicatively coupled to a core network (CN) 120 via an S1 interface 113. In embodiments, the CN 120 may be an evolved packet core (EPC) network, a NextGen Packet Core (NPC) network, or some other type of CN (e.g., as illustrated in reference to FIGS. 1B-1C). In this aspect, the S interface 113 is split into two parts: the S1-U interface 114, which carries traffic data between the RAN nodes 111 and 112 and the serving gateway (S-GW) 122, and the S-mobility management entity (MME) interface 115, which is a signaling interface between the RAN nodes 111 and 112 and MMEs 121.

In this aspect, the CN 120 comprises the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility embodiments in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-RAN node handovers and also may provide an anchor for inter-3GPP mobility. Other responsibilities of the S-GW 122 may include a lawful intercept, charging, and some policy enforcement.

The P-GW 123 may terminate an SGi interface toward a PDN. The P-GW 123 may route data packets between the EPC network 120 and external networks such as a network including the application server 184 (alternatively referred to as application function (AF)) via an Internet Protocol (IP) interface 125. The P-GW 123 can also communicate data to other external networks 131A, which can include the Internet, IP multimedia subsystem (IPS) network, and other networks. Generally, the application server 184 may be an element offering applications that use IP bearer resources with the core network (e.g., UMTS Packet Services (PS) domain, LTE PS data services, etc.). In this aspect, the P-GW 123 is shown to be communicatively coupled to an application server 184 via an IP interface 125. The application server 184 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 may further be a node for policy enforcement and charging data collection. Policy and Charging Rules Function (PCRF) 126 is the policy and charging control element of the CN 120. In a non-roaming scenario, in some embodiments, there may be a single PCRF in the Home Public Land Mobile Network (HPLMN) associated with a UE's Internet Protocol Connectivity Access Network (IP-CAN) session. In a roaming scenario with a local breakout of traffic, there may be two PCRFs associated with a UE's IP-CAN session: a Home PCRF (H-PCRF) within an HPLMN and a Visited PCRF (V-PCRF) within a Visited Public Land Mobile Network (VPLMN). The PCRF 126 may be communicatively coupled to the application server 184 via the P-GW 123.

In some embodiments, the communication network 140A can be an IoT network or a 5G network, including 5G new radio network using communications in the licensed (5G NR) and the unlicensed (5G NR-U) spectrum. One of the current enablers of IoT is the narrowband-IoT (NB-IoT).

An NG system architecture can include the RAN 110 and a 5G network core (5GC) 120. The NG-RAN 110 can include a plurality of nodes, such as gNBs and NG-eNBs. The core network 120 (e.g., a 5G core network or 5GC) can include an access and mobility function (AMF) and/or a user plane function (UPF). The AMF and the UPF can be communicatively coupled to the gNBs and the NG-eNBs via NG interfaces. More specifically, in some embodiments, the gNBs and the NG-eNBs can be connected to the AMF by NG-C interfaces, and to the UPF by NG-U interfaces. The gNBs and the NG-eNBs can be coupled to each other via Xn interfaces.

In some embodiments, the NG system architecture can use reference points between various nodes as provided by 3GPP Technical Specification (TS) 23.501 (e.g., V15.4.0, 2018-12). In some embodiments, each of the gNBs and the NG-eNBs can be implemented as a base station, a mobile edge server, a small cell, a home eNB, and so forth. In some embodiments, a gNB can be a master node (MN) and NG-eNB can be a secondary node (SN) in a 5G architecture.

Figure 1B:
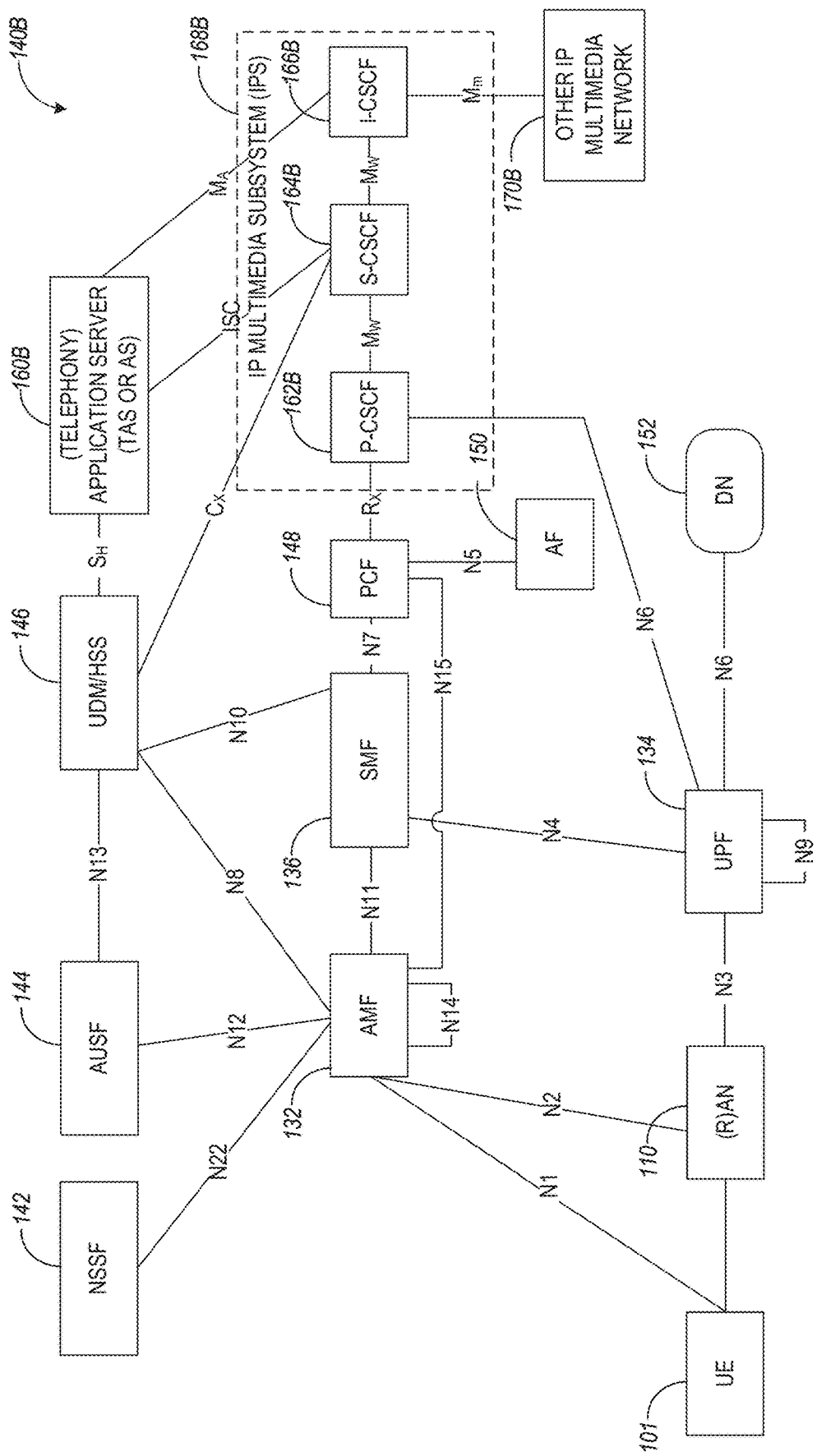
FIG. 1B and FIG. 1C illustrate a non-roaming 5G system architecture in accordance with some embodiments.

FIG. 1B illustrates a non-roaming 5G system architecture in accordance with some embodiments. Referring to FIG. 1B, there is illustrated a 5G system architecture 140B in a reference point representation. More specifically, UE 102 can be in communication with RAN 110 as well as one or more other 5G core (5GC) network entities. The 5G system architecture 140B includes a plurality of network functions (NFs), such as access and mobility management function (AMF) 132, session management function (SMF) 136, policy control function (PCF) 148, application function (AF) 150, user plane function (UPF) 134, network slice selection function (NSSF) 142, authentication server function (AUSF) 144, and unified data management (UDM)/home subscriber server (HSS) 146. The UPF 134 can provide a connection to a data network (DN) 152, which can include, for example, operator services, Internet access, or third-party services. The AMF 132 can be used to manage access control and mobility and can also include network slice selection functionality. The SMF 136 can be configured to set up and manage various sessions according to network policy. The UPF 134 can be deployed in one or more configurations according to the desired service type. The PCF 148 can be configured to provide a policy framework using network slicing, mobility management, and roaming (similar to PCRF in a 4G communication system). The UDM can be configured to store subscriber profiles and data (similar to an HSS in a 4G communication system).

In some embodiments, the 5G system architecture 140B includes an IP multimedia subsystem (IMS) 168B as well as a plurality of IP multimedia core network subsystem entities, such as call session control functions (CSCFs). More specifically, the IMS 168B includes a CSCF, which can act as a proxy CSCF (P-CSCF) 162BE, a serving CSCF (S-CSCF) 164B, an emergency CSCF (E-CSCF) (not illustrated in FIG. 1B), or interrogating CSCF (I-CSCF) 166B. The P-CSCF 162B can be configured to be the first contact point for the UE 102 within the IM subsystem (IMS) 168B. The S-CSCF 164B can be configured to handle the session states in the network, and the E-CSCF can be configured to handle certain embodiments of emergency sessions such as routing an emergency request to the correct emergency center or PSAP. The I-CSCF 166B can be configured to function as the contact point within an operator's network for all IMS connections destined to a subscriber of that network operator, or a roaming subscriber currently located within that network operator's service area. In some embodiments, the I-CSCF 166B can be connected to another IP multimedia network 170E, e.g. an IMS operated by a different network operator.

In some embodiments, the UDM/HSS 146 can be coupled to an application server 160E, which can include a telephony application server (TAS) or another application server (AS). The AS 160B can be coupled to the IMS 168B via the S-CSCF 164B or the I-CSCF 166B.

A reference point representation shows that interaction can exist between corresponding NF services. For example, FIG. 1B illustrates the following reference points: N1 (between the UE 102 and the AMF 132), N2 (between the RAN 110 and the AMF 132), N3 (between the RAN 110 and the UPF 134), N4 (between the SMF 136 and the UPF 134), N5 (between the PCF 148 and the AF 150, not shown), N6 (between the UPF 134 and the DN 152), N7 (between the SMF 136 and the PCF 148, not shown), N8 (between the UDM 146 and the AMF 132, not shown), N9 (between two UPFs 134, not shown), N10 (between the UDM 146 and the SMF 136, not shown), N11 (between the AMF 132 and the SMF 136, not shown), N12 (between the AUSF 144 and the AMF 132, not shown), N13 (between the AUSF 144 and the UDM 146, not shown), N14 (between two AMFs 132, not shown), N15 (between the PCF 148 and the AMF 132 in case of a non-roaming scenario, or between the PCF 148 and a visited network and AMF 132 in case of a roaming scenario, not shown), N16 (between two SMFs, not shown), and N22 (between AMF 132 and NSSF 142, not shown). Other reference point representations not shown in FIG. 1B can also be used.

Figure 1C:
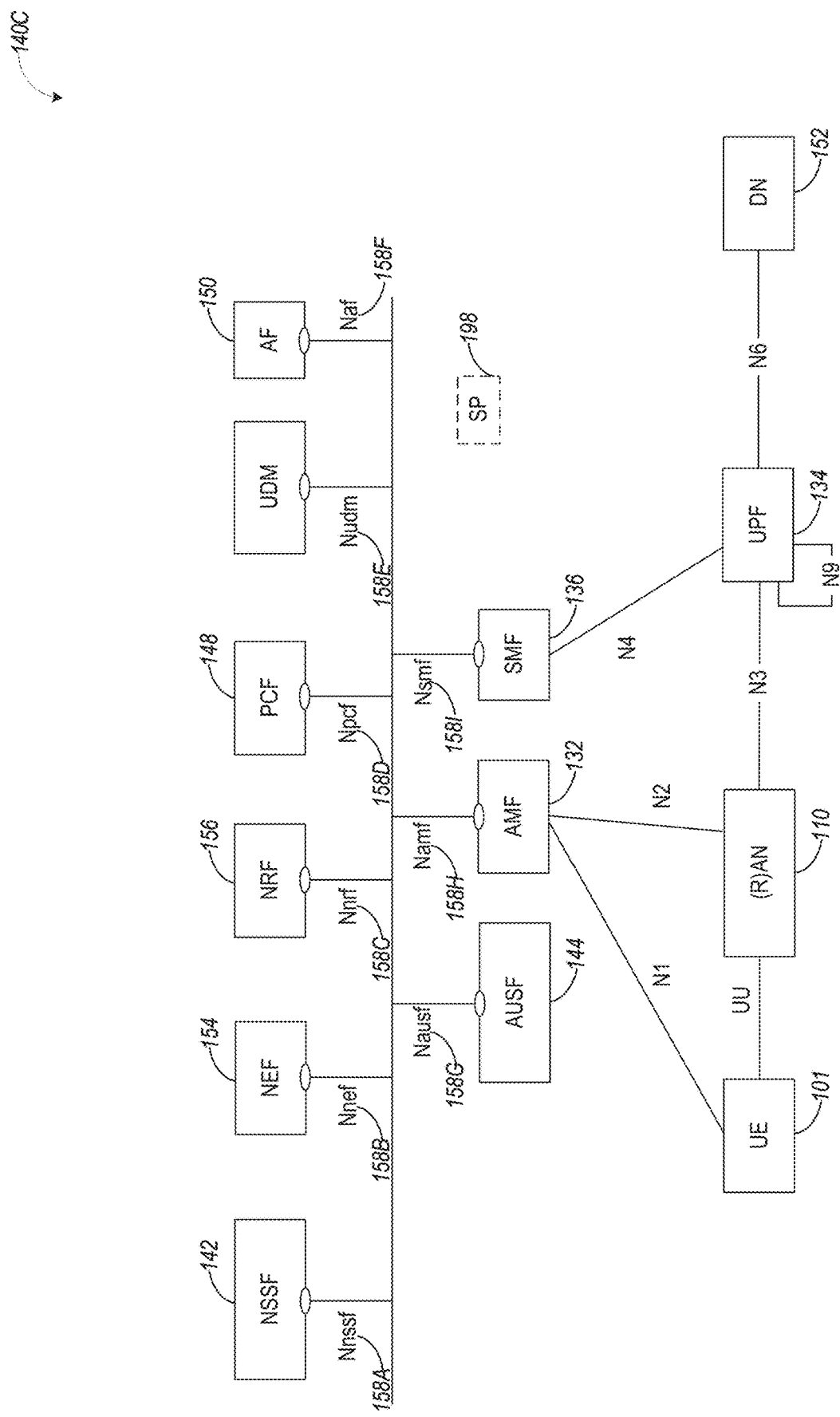

FIG. 1C illustrates a 5G system architecture 140C and a service-based representation. In addition to the network entities illustrated in FIG. 1B, system architecture 140C can also include a network exposure function (NEF) 154 and a network repository function (NRF) 156. In some embodiments, 5G system architectures can be service-based and interaction between network functions can be represented by corresponding point-to-point reference points Ni or as service-based interfaces.

In some embodiments, as illustrated in FIG. 1C, service-based representations can be used to represent network functions within the control plane that enable other authorized network functions to access their services. In this regard, 5G system architecture 140C can include the following service-based interfaces: Namf 158H (a service-based interface exhibited by the AMF 132), Nsmf 158I (a service-based interface exhibited by the SMF 136), Nnef 158B (a service-based interface exhibited by the NEF 154), Npcf 158D (a service-based interface exhibited by the PCF 148), a Nudm 158E (a service-based interface exhibited by the UDM 146), Naf 158F (a service-based interface exhibited by the AF 150), Nnrf 158C (a service-based interface exhibited by the NRF 156), Nnssf 158A (a service-based interface exhibited by the NSSF 142), Nausf 158G (a service-based interface exhibited by the AUSF 144). Other service-based interfaces (e.g., Nudr, N5g-eir, and Nudsf) not shown in FIG. 1C can also be used.

In some embodiments, any of the UEs or base stations described in connection with FIGS. 1A-1C can be configured to perform the functionalities described herein.

Figure 2:
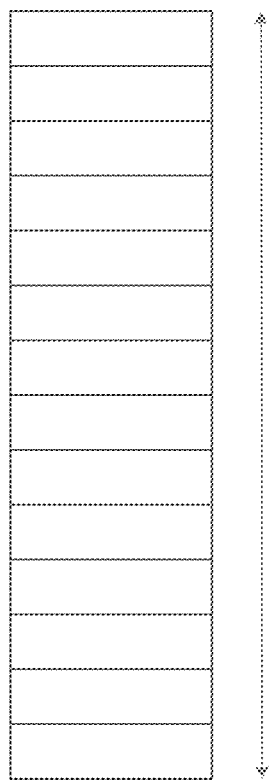
FIG. 2 illustrates a slot duration of fourteen (14) symbols with a large subcarrier spacing.

Embodiments are directed to reference signal generation for slot-less operation. Some embodiments are directed to slot-less operation at frequencies above a 52.6 GHz carrier frequency. In some of these embodiments, a generation node B (gNB) configured for operating in a fifth-generation (5G) new radio (NR) or a sixth-generation (6G) network may generate signalling to configure a user equipment (UE) with a gap between demodulation reference signal (DMRS) symbols for an associated physical downlink shared channel (PDSCH). The gNB may also encode the DMRS symbols for transmission in accordance with the gap. The associated PDSCH may be transmitted during the gap between the DMRS symbol transmissions at symbol times following the DMRS symbols. Examples of these embodiments are illustrated in FIG. 2 (described in more detail below). As illustrated in FIG. 2, a single PDSCH is transmitted. Within the PDSCH there are multiple PDSCH symbols with may be uniformly distributed. In these embodiments, the gap can be either configured by higher layers or dynamically indicated in a downlink control information (DCI) format. Thus, for different PDSCHs, the gap between DMRS symbols can be different. Accordingly, a subsequent PDSCH can be configured with a different gap between the DMRS transmissions.

In some embodiments, the signalling to configure the UE with the gap comprises a downlink control information (DCI) format, the DCI format to dynamically indicate the gap to the UE. In some embodiments, the gNB may encode a second DCI format to configure the UE with a second gap for a subsequent associated PDSCH and may encode subsequent DMRS symbols for transmission in accordance with the second gap for the subsequent associated PDSCH.

Figure 3:
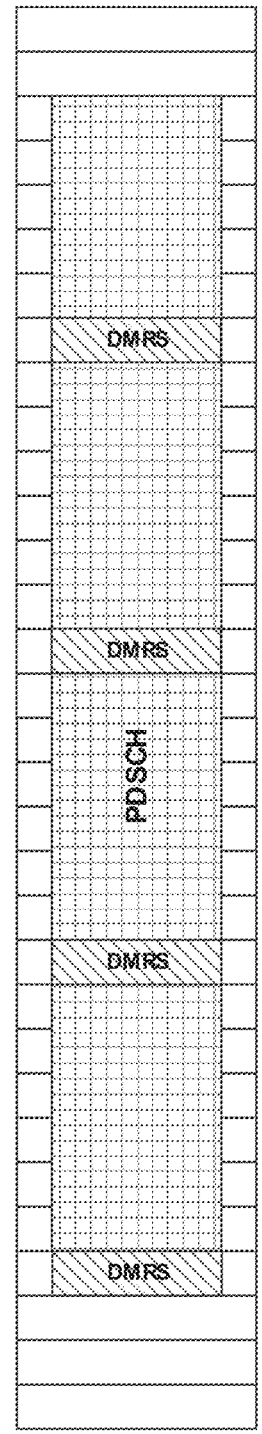
FIG. 3 illustrates a uniform demodulation reference signal (DMRS) pattern for slot-less operation in accordance with some embodiments.

In some embodiments, the PDSCH comprises a plurality of code block groups (CBGs). In these embodiments, the gNB may encode a physical downlink control channel (PDCCH) for transmission comprising a DCI format that scheduled the PDSCH. In some embodiments, the DCI format may comprise a starting symbol and length indicator value (SLIV) of a first CBG of the PDSCH. In some embodiments, the gap in indicated by the SLIV, and the DMRS symbols are encoded for transmission outside the SLIV for each CBG of the PDSCH. In some embodiments, a first of the DMRS symbols may be encoded for transmission at a symbol time prior to a first CBG of the PDSCH. Examples of these embodiments are illustrated in FIG. 3 (described in more detail below).

Figure 4:
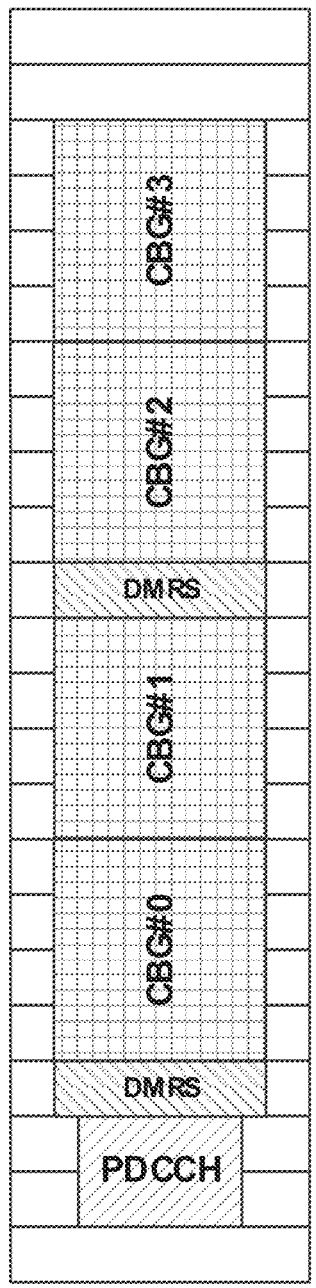
FIG. 4 illustrates a DMRS pattern for slot-less operation: outside a starting symbol and length indicator value (SLIV) in accordance with some embodiments.

In some embodiments, for DMRS symbols that are allocated inside the SLIV, the DMRS symbols collide with a CBG of the PDSCH. Examples of these embodiments are illustrated in FIG. 4 (described in more detail below).

Figure 5:
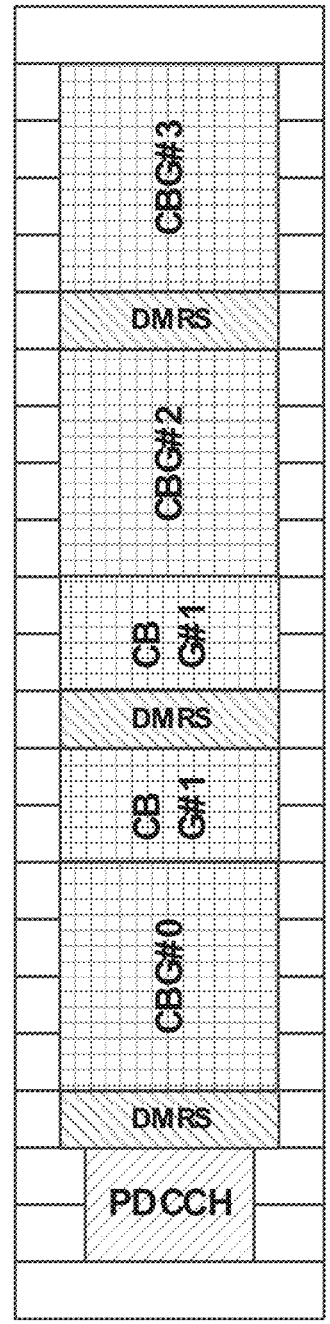
FIG. 5 illustrates a DMRS pattern for slot-less operation: inside a SLIV in accordance with some embodiments.

In some embodiments, when a DMRS symbol is indicated to overlap with a rate-matched resource or a CBG based on the gap and the SLIV, the gNB may shift the overlapping DMRS symbol transmission to a first data symbol after rate-matched resource or a CBG. Examples of these embodiments are illustrated in FIG. 5 (described in more detail below).

In some embodiments, the rate-matched resource may comprise a control resource set (CORESET) for a physical downlink control channel (PDCCH) transmission. In these embodiments, the PDSCH may be rate-matched around the CORESET and a DMRS symbol that overlaps with the CORESET for a PDCCH transmission may be shifted.

Figure 6:
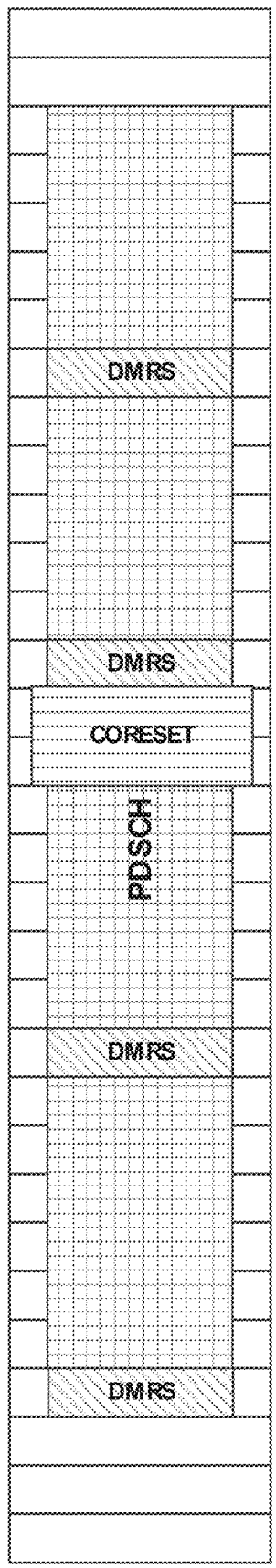
FIG. 6 illustrates a DMRS pattern when colliding with rate-matched resources in accordance with some embodiments.

In some embodiments, the gap may be a uniform gap configured to provide a same number of PDSCH symbols between DMRS transmissions, although the scope of the embodiments is not limited in this respect In some embodiments, the gap may be a non-uniform gap configured by higher-layer signalling. In these embodiments, a first gap between first and second DMRS symbols may be less than a second gap between the second and a third DMRS symbols. Examples of these embodiments are illustrated in FIG. 6 (described in more detail below). These embodiments may be utilized to help the receiver to perform timing/frequency offset tracking, although the scope of the embodiments is not limited in this respect.

In some embodiments, the gNB may generate the DMRS based on either a Gold sequence with pi/2 BPSK modulation or a Zadoff-Chu (ZC) sequence.

In some embodiments, the signalling to configure the UE with the gap may comprise higher-layer signalling. In some embodiments, the higher-layer signalling may comprise radio-resource control (RRC) signalling.

In some embodiments, the gNB may decode a physical uplink shared channel (PUSCH) received from the UE based on DMRS symbols transmitted by the UE in accordance with the configured gap.

These embodiments are described in more detail below

Mobile communication has evolved significantly from early voice systems to today's highly sophisticated integrated communication platform. The next generation wireless communication system, 5G, or new radio (NR) will provide access to information and sharing of data anywhere, anytime by various users and applications. NR is expected to be a unified network/system that targets to meet vastly different and sometimes conflicting performance dimensions and services. Such diverse multi-dimensional requirements are driven by different services and applications. In general, NR will evolve based on 3GPP LTE-Advanced with additional potential new Radio Access Technologies (RATs) to enrich people's lives with better, simple, and seamless wireless connectivity solutions. NR will enable everything connected by wireless and deliver fast, rich content and services.

Rel-15 NR systems are designed to operate on the licensed spectrum. The NR-unlicensed (NR-U), a short-hand notation of the NR-based access to unlicensed spectrum, is a technology that enables the operation of NR systems on the unlicensed spectrum.

In Rel-15, resource allocation of one data transmission is confined within a slot, where one slot has 14 symbols. For systems operating above 52.6 GHz carrier frequency, it is envisioned that a larger subcarrier spacing is needed to combat severe phase noise. In cases when a larger subcarrier spacing, e.g., 1.92 MHz or 3.84 MHz is employed, the slot duration can be very short. For instance, for 1.92 MHz subcarrier spacing, one slot duration is approximately 7.8 μs as shown in FIG. 2. This extremely short slot duration may not be sufficient for higher layer processing, including Medium Access Layer (MAC) and Radio Link Control (RLC), etc.

To address this issue, one option is to increase the number of symbols within a slot. Alternatively, a gNB may schedule the DL or UL data transmission across slot boundary. This option may indicate that the concept of slot may not be necessary, which may provide maximal flexibility at gNB on the data scheduling.

In Rel-15, reference signals, including demodulation reference signal (DMRS), channel state information reference signal (CSI-RS), phase tracking reference signal (PT-RS), tracking reference signal (TRS), sounding reference signal (SRS), etc., are generated as a function of symbol and slot index. In case when slot-less operation is used for system operating above 52.6 GHz, embodiments of the present disclosure may be used for the generation of a reference signal.

Among other things, embodiments of the present disclosure are directed to reference signal design for slot-less operation, particularly for systems operating above the 52.6 GHz carrier frequency. In particular, some embodiments may be directed to: Mechanisms on reference signal generation for slot-less operation and DMRS pattern for slot-less operation Reference Signal Generation for Slot-Less Operation Note that in Rel-15, for PUSCH with Discrete Fourier Transform-spread-OFDM (DFT-s-OFDM) waveform, DMRS sequence is generated based on Zadoff-Chu (ZC) sequence in the frequency domain. Furthermore, in Rel-16, to further reduce the peak-to-average power ratio (PAPR), Gold sequence with pi/2 BPSK modulation in pre-DFT time domain was defined for DMRS sequence generation.

For systems operating above 52.6 GHz, a gNB may schedule the DL or UL data transmission across slot boundary. This option may indicate that the concept of slot may not be necessary, which may provide maximal flexibility at the gNB for data scheduling. For slot-less operation, design changes on the reference signal generation including DMRS, CSI-RS, TRS, SRS, PT-RS may need to be considered for system operating above 52.6 GHz carrier frequency. Embodiments for reference signal generation for slot-less operation are provided as follows:

In one embodiment, a reference signal in DL and/or UL can be generated based on either Gold sequence with pi/2 BPSK modulation or Zadoff-Chu (ZC) sequence. The reference signal may include, but may not be limited to DMRS, CSI-RS, TRS, SRS, PT-RS.

In one embodiment, reference signal generation is defined as a function of symbol index. Further, the symbol index is defined with respect to a reference timing. In particular, the reference timing can be 1 ms subframe boundary or 10 ms frame boundary. Given that slot index is not defined for slot-less operation, symbol index can be used for reference signal generation for inter-cell interference randomization.

In one embodiment, when Gold sequence with pi/2 BPSK modulation is applied for the reference signal generation, initialization seed of sequence generation can be defined as $$c_{init} = \left(2^{17}(f(l) + 1)(2N_{ID}^{n_{SCID}} + 1) + 2N_{ID}^{n_{SCID}} + n_{SCID}\right) \bmod 2^{31}$$

Where l is the symbol index with respect to reference timing and f(l) is a function of l.

$n_{SCID}=\{0,1\}$. For physical downlink shared channel (PDSCH) and/or physical uplink shared channel (PUSCH) which is scheduled by fallback downlink control information (DCI), e.g., DCI format 0_0 and/or 1_0, or for configured grant PUSCH based transmission, $n_{SCID}=0$. For DSCH and/or PUSCH which is scheduled by non-fallback downlink control information (DCI), e.g., DCI format 0_1, 0_2 and/or 1_1, 1_2, $n_{SCID}$ can be dynamically indicated by the DCI.

$N_{ID}^0, N_{ID}^1$ can be configured by higher layers via minimum system information (MSI), remaining minimum system information (RMSI), other system information (OSI) or dedicated radio resource control (RRC) signalling. A default value $$N_{ID}^{n_{SCID}} = N_{ID}^{cell},$$

where $N_{ID}^{cell}$ is the physical cell ID.

In one example, $f(l)=l$, the reference signal can be initialized as:

$$c_{init} = \left(2^{17}(l + 1)(2N_{ID}^{n_{SCID}} + 1) + 2N_{ID}^{n_{SCID}} + n_{SCID}\right) \bmod 2^{31}$$

In another example, $f(l)=\bmod(l, N)$, the reference signal can be initialized as:

$$c_{init} = \left(2^{17}(\bmod(l, N) + 1)(2N_{ID}^{n_{SCID}} + 1) + 2N_{ID}^{n_{SCID}} + n_{SCID}\right) \bmod 2^{31}$$

Note that in the equation, N can be predefined in the specification, e.g., $N=2^n$, and n is a positive integer or configured by higher layers via MSI, RMSI (SIB1), OSI or RRC signalling.

Yet in another example, $$f(l) = \left\lfloor \frac{l}{N} \right\rfloor,$$

the reference signal can be initialized as:

$$c_{init} = \left(2^{17}\left(\left\lfloor \frac{l}{N} \right\rfloor + 1\right)(2N_{ID}^{n_{SCID}} + 1) + 2N_{ID}^{n_{SCID}} + n_{SCID}\right) \bmod 2^{31}$$

In another embodiment multiple DM-RS ports, each corresponding to a MIMO layer, can be multiplexed in each DM-RS symbol. In one example, a comb-2 (or comb-3) resource mapping, with DM-RS sequences from the same ports occupying alternate (or every third) REs in PRB can be used to multiplex 2 (or 3) DM-RS ports, one in each comb. Additionally, code division multiplexing of two DM-RS ports can be achieved within each comb by using orthogonal cover codes. For the case when more than one DM-RS port is multiplexed within a DM-RS symbol, the initialization of the Gold sequence can be port or comb specific e.g., $$c_{init} = \left(2^{17}(f(l)+1)(2N_{ID}^{nSCID}+1) + 2^{17}g(\lambda) + 2N_{ID}^{n^\lambda_{SCID}} + n^\lambda_{SCID}\right) \mod 2^{31}$$

where $n_{SCID}^\lambda \in \{0,1\}$ changes as a function of the comb index (or CDM group index) $\lambda \in \{0,1,2\}$ and the function $g(\lambda)$ is a function of $\lambda$. As an example, the function can be:

$g(\lambda) = \lfloor \lambda/2 \rfloor$

OR we can have the function:
$g(\lambda) = \lambda$, for $\lambda \in 0,1,2$.

For reference signals including CSI-RS, TRS, PT-RS, SRS, the initialization seed of reference signal can be given by:

$c_{init} = (2^{17}(f(l)+l+1)(2N_{ID}+1)+2N_{ID}) \mod 2^{31}$

Where $N_{ID}$ can be configured by higher layers via MSI, RMSI (SIB1), OSI or RRC signalling. Note that $f(l)$ can be generated in the same manner as the aforementioned examples.

In another embodiment, when a ZC sequence is used for the reference signal generation, for group and sequence hopping, the root sequence can be generated as a function of symbol index.

In one example, the grouping and sequence hopping for ZC sequence generation for DMRS in Section 6.3.2.2 in TS38.211 [1] can be updated as shown below:

if group hopping is enabled and sequence hopping is disabled $$f_{gh} = \left(\sum_{m=0}^{7} 2^m c(8 \cdot f(l)+m)\right) \mod 30$$

$v = 0$ where the pseudo-random sequence c(i) is defined by clause 5.2.1 and shall be initialized with $c_{init} = \lfloor n_{ID}^{RS}/30 \rfloor$ at the beginning of each radio frame
if sequence hopping is enabled and group hopping is disabled $f_{gh}=0$ $$v = \begin{cases} c(f(l)) & \text{if } M_{ZC} \geq 6N_{sc}^{RB} \\ 0 & \text{otherwise} \end{cases}$$

where the pseudo-random sequence c(i) is defined by clause 5.2.1 and shall be initialized with $c_{init} = n_{ID}^{RS}$ at the beginning of each radio frame.

Note that similarly, $f(l)$ can be generated same as aforementioned examples.

When cyclic shift hopping is applied for the ZC sequence generation, cyclic shift can be defined as a function of symbol index. In one example, the cyclic shift for ZC sequence generation for DMRS in Section 6.3.2.2 in TS38.211 [1] can be updated as shown below:

The function $n_{cs}(l)$ is given by $$n_{cs}(l) = \sum_{m=0}^{7} 2^m c(Bf(l)+m)$$

where the pseudo-random sequence c(i) is defined by clause 5.2.1. The pseudo-random sequence generator shall be initialized with $c_{init}=n_{ID}$, where $n_{ID}$ is given by the higher-layer parameter hoppingId if configured, otherwise $n_{ID}=N_{ID}^{cell}$.

Note that $f(l)$ can be generated the same as in the aforementioned examples.

In another embodiment, for PUSCH transmission with 1, 2, 3 or 4 PRBs, sets of K binary computer generated sequences (CGS) modulated by pi/2 BPSK can be used where $K \in \{15, 30\}$. Alternately, CGS sequence generated from M-PSK constellation in the time domain with $M \in \{4, 8,16\}$. For CGS sequences, group hopping based on symbol index, where the root sequence is chosen from the set of K sequences can be used as mentioned in the previous examples.

In another example of using CGS sequences, complementary CGS can be used wherein for every pair of DM-RS symbols, a pair of pre-defined complementary sequences are used such that the joint autocorrelation of the sequence pair is ideal or almost ideal. When complementary sequence pairs are used and uniform spacing of 0 OFDM symbols between any two DM-RS symbols are assumed, grouping and sequence hopping for sequence generation for DMRS in Section 6.3.2.2 in TS38.211 [1] can be updated as shown below such that the hopping occurs over every pair of DM-RS symbols:

if group hopping is enabled and sequence hopping is disabled $$f_{gh} = \left(\sum_{m=0}^{7} 2^m c\left(8 \cdot f\left(\left\lfloor \frac{l-g}{2*g} \right\rfloor\right)+m\right)\right) \mod 30$$

$v = 0$ where the pseudo-random sequence c(i) is defined by clause 5.2.1 and shall be initialized with $c_{init} = \lfloor n_{ID}^{RS}/30 \rfloor$ at the beginning of each radio frame, g is the gap in OFDM symbols between any two DM-RS symbols.

In another embodiment for DMRS sequence generation, the symbol index can be defined with respect to the starting symbol of scheduled PDSCH and/or PUSCH transmission. In another option, the symbol index can be defined with respect to the starting or ending symbol of scheduling PDCCH or the starting or ending symbol of CORESET which includes the scheduling PDCCH.

Note in case of cross-numerology scheduling where different numerologies are employed for scheduling PDCCH and scheduled PDSCH and/or PUSCH, the symbol index is defined in accordance with the scheduled PDSCH and/or PUSCH transmission. In particular, l=0 may correspond to the last symbol index of PDSCH and/or PUSCH which overlaps with the last symbol of PDCCH.

In one example, when Gold sequence with pi/2 BPSK modulation is applied for the reference signal generation, initialization seed of sequence generation of DMRS can be defined as:

$$c_{init} = \left(2^{17}(l+1)\left(2N_{ID}^{nSCID}+1\right)+2N_{ID}^{nSCID}+n_{SCID}\right) \bmod 2^{31}$$

Where l is the symbol index of DMRS symbol with respect to the ending symbol of corresponding PDCCH.

In another embodiment, the DM-RS sequence generation doesn't depend on the OFDM symbol index, e.g. l=0 in the aforementioned equations.

As a further extension, reference signal generation may not be defined as a function of symbol index.

DMRS Pattern for Slot-Less Operation

For slot-less operation, it is possible that the number of symbols allocated for data transmission, including physical downlink shared channel (PDSCH) and/or physical uplink shared channel (PUSCH), can be relatively large. For instance, the date transmission duration can span larger than 14 symbols. In this case, the DMRS pattern as defined in NR Rel-15 may not be directly reused. To resolve this issue, certain design changes need to be considered for DMRS pattern of data transmission when slot-less operation is employed for systems operating above 52.6 GHz.

Embodiments of DMRS pattern of data transmission for slot-less operation are provided as follows:

In one embodiment, front-loaded DMRS is used for slot-less operation. Further, additional DMRS symbol(s) can be configured by higher layers via minimum system information (MSI), remaining minimum system information (RMSI), other system information (OSI) or dedicated radio resource control (RRC) signaling or dynamically indicated in the downlink control information (DCI) or a combination thereof.

In one option, a set of positions regarding additional DMRS symbols can be predefined in the specification or configured by higher layers. Further, one field in the DCI may be dynamically indicated which position from the set of the position for additional DMRS symbols. For example, RRC signaling can be used to configure multiple additional DM-RS patterns and MAC-CE signaling can then be used to down-select from these patterns to form a sub-set of patterns and finally dynamic signaling using a DCI field can indicate of the down-selected patterns.

In another option, 1-bit indicator can be configured by higher layers or dynamically indicated in the DCI to indicate whether additional symbols are employed for the transmission of PDSCH and/or PUSCH. More specifically, bit "0" may indicate that only front-loaded DMRS is employed while bit "1" may indicate that front-loaded DMRS and additional DMRS symbols are employed for the PDSCH and/or PUSCH transmission. Note that in this case, additional DMRS symbols may be configured by higher layers.

In another embodiment, uniformly distributed DMRS symbols can be employed for the PDSCH and PUSCH transmission. In one option, the gap between first symbol of front-loaded DMRS symbol(s) and additional symbol(s), as well as between additional symbol(s) can be configured by higher layers via MSI, RMSI (SIB1), OSI or RRC signaling or dynamically indicated in the DCI or a combination thereof. Based on the gap between the DMRS symbols and length of PDSCH and/or PUSCH transmission, UE can derive the additional DMRS symbol position.

In another option, the number of DMRS symbols including front-loaded DMRS symbol can be configured by higher layers via MSI, RMSI (SIB1), OSI or RRC signaling or dynamically indicated in the DCI or a combination thereof. Based on the total number of DMRS symbols and length of PDSCH and/or PUSCH transmission, UE can derive the additional DMRS symbol position.

FIG. 3 illustrates one example of a uniform DMRS pattern for slot-less operation. In the example, 4 DMRS symbols are associated with the PDSCH transmission. Further, the gap between DMRS symbols is 7 symbols, which can be configured by higher layers via RRC signaling.

In another embodiment, in case of single PDSCH scheduling with one or more code blocks (CB) or code block groups (CBG) or multiple PDSCH scheduling, it is expected that one CB or CBG in case of single PDSCH scheduling or one PDSCH in case of multiple PDSCH scheduling is aligned with the symbol boundary. In this case, the starting symbol and length indicator value (SLIV) of first CB/CBG or PDSCH can be indicated in the DCI for scheduling PDSCH. As a further extension, the number of symbols or length of the CB/CBG or PDSCH transmission can be same during PDSCH transmission.

For DMRS associated with PDSCH transmission, DMRS is allocated independent of SLIV for each CB/CBG or PDSCH transmission. More specifically, DMRS symbols are configured first during PDSCH transmission and then CB/CBG or PDSCH is mapped in accordance with the indicated SLIV after DMRS symbols are mapped.

Note that for this option, transport block size (TBS) for one CBG or PDSCH can be derived in accordance with SLIV, without considering the DMRS overhead.

In one option, DMRS symbols are allocated outside the SLIV for each CB/CBG or PDSCH. Further, the gap between DMRS symbols can be k*length which is indicated by SLIV, where k can be predefined in the specification, configured by higher layers via RMSI (SIB1), OSI or RRC signaling, or can be derived based on the length which is indicated by SLIV and the maximum duration of PDSCH or PUSCH if uniform DMRS pattern is employed. In one example, k=1, which indicates that DMRS symbols are inserted before each CB/CBG or PDSCH transmission.

FIG. 4 illustrates one example of DMRS pattern for slot-less operation when DMRS symbols are allocated outside the SLIV for each CB/CBG or PDSCH. In the example, each CBG spans 4 symbols. The first DMRS symbol is located before the first CBG, or CBG #0. The gap between the first and second DMRS symbol is 8 symbols or 2 times of the length which is indicated by SLIV, i.e., k=2.

In another option, DMRS symbols can be allocated inside the SILV for each CB/CBG or PDSCH. Further, the gap between DMRS symbols can be configured by higher layers via RMSI(SIB1), OSI or RRC signalling or can be derived based on the maximum duration of PDSCH or PUSCH if uniform DMRS pattern is employed. Note that when DMRS symbols collide with CB/CBG or PDSCH, the impacted CB/CBG or PDSCH continues to be mapped and spans the number of symbols or length which is indicated by SLIV.

FIG. 5 illustrates one example of DMRS pattern for slot-less operation when DMRS symbols can be allocated inside the SLIV for each CB/CBG or PDSCH. In the example, each CBG spans 4 symbols. The first DMRS symbol is located before the first CBG, or CBG #0. The gap between the first and second DMRS symbol is 6 symbols. In this case, the second DMRS symbol collides with CBG #1. Note that CBG #1 continues to be mapped and spans 4 symbols.

In another embodiment, the gap between DMRS may be aligned with the length of symbol group. Note that the symbol group or a number of symbols within a symbol group can be viewed as basic scheduling unit or resource allocation unit for PDSCH and/or PUSCH transmission. Further, the length of symbol group can be predefined in the specification or configured by higher layers via MSI, RMSI (SIB1), OSI or RRC signaling. For instance, when the length of symbol group is configured as 7, the gap between DMRS can be 7. In other words, DMRS symbols are inserted at the beginning of each symbol group for PDSCH and/or PUSCH transmission.

In another embodiment, the DM-RS is transmitted every N-th group of PDSCH/PUSCH symbols, where N can be indicated by higher layer or by DCI or a combination thereof. The group of OFDM symbols can be used to determine code-block segmentation.

In another embodiment, for PDSCH carrying RMSI, the gap between DMRS symbols or total number of DMRS symbols can be predefined in the specification. In one example, the gap between DMRS symbols can be fixed to 7. In another option, a set of the gap values between or total number of DMRS symbols can be predefined in the specification or configured by MSI. Further, one field in the DCI may be used to indicate one value from the set of the gap values or the total number of DMRS symbols to determine the DMRS symbol position, respectively.

For PDSCH carrying OSI or SIB or common control message including random access response (RAR) and paging, or for data transmission scheduled by fallback DCI or DCI format 1_0 or 0_0, the gap between DMRS symbols or total number of DMRS symbols can be directly configured by RMSI. In another option, a set of the gap values between or total number of DMRS symbols can be configured by RMSI. Further, one field in the DCI may be used to indicate one value from the set of the gap values or the total number of DMRS symbols to determine the DMRS symbol position, respectively.

Further, for data transmissions scheduled by non-fallback DCI or DCI format 1_1, 1_2, 0_1 or 0_2, the gap between DMRS symbols or total number of DMRS symbols can be configured by RRC signaling. In another option, a set of the gap values between DMRS symbols or total number of DMRS symbols can be configured by RRC signaling. Further, one field in the DCI may be used to indicate one value from the set of the gap values or the total number of DMRS symbols to determine the DMRS symbol position, respectively.

Note that the configuration, including the set of the gap values, may be separately configured for PDSCH and PUSCH.

In another embodiment, when a DMRS symbol overlaps with rate-matched resource, e.g., control resource set (CORESET) for physical downlink control channel (PDCCH) transmission, the DMRS symbol is shifted to the first data symbol after the rate-matched resource. Note that rate-matched resource indicates the resource where PDSCH and/or PUSCH is rate-matched around and DM-RS overlap with such resources is not allowed.

FIG. 6 illustrates one example of a DMRS pattern when colliding with rate-matched resources. In the figure, PDSCH is rate-matched around the CORESET and third DMRS symbol overlaps with the CORESET for PDCCH transmission. In this case, third DMRS symbol is shifted after the CORESET.

Note that the above embodiments can be extended to cases when a double-symbol DMRS is used for DMRS transmission.

In another embodiment, a non-uniform DMRS pattern can be employed for the transmission of PDSCH and/or PUSCH. In one option, to allow the receiver to perform timing/frequency offset tracking, a first gap with smaller value can be used between a first and second DMRS symbol. Further, a second gap with larger value can be used between the remaining DMRS symbols. Note that the first and second gap can be predefined in the specification or configured by higher layers via MSI, RMSI (SIB1), OSI or RRC signaling, which can be similar to the aforementioned embodiments.

Figure 7:
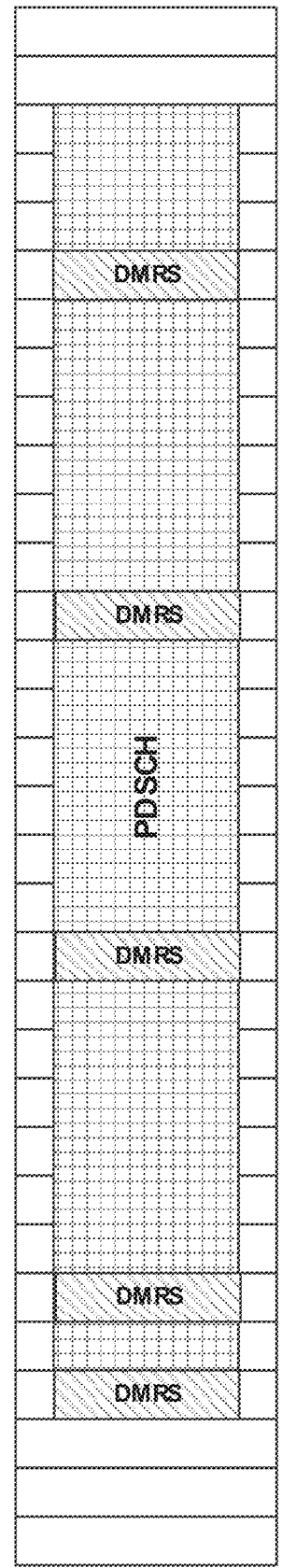
FIG. 7 illustrates a non-uniform DMRS pattern for slot-less operation in accordance with some embodiments.

FIG. 7 illustrates one example of a non-uniform DMRS pattern for slot-less operation. In the example, 5 DMRS symbols are associated with the PDSCH transmission. Further, the first gap between the first and second DMRS symbols is 2 symbols, and the second gap between the remaining DMRS symbols is 7 symbols, which can be configured by higher layers via RRC signaling.

Figure 8:
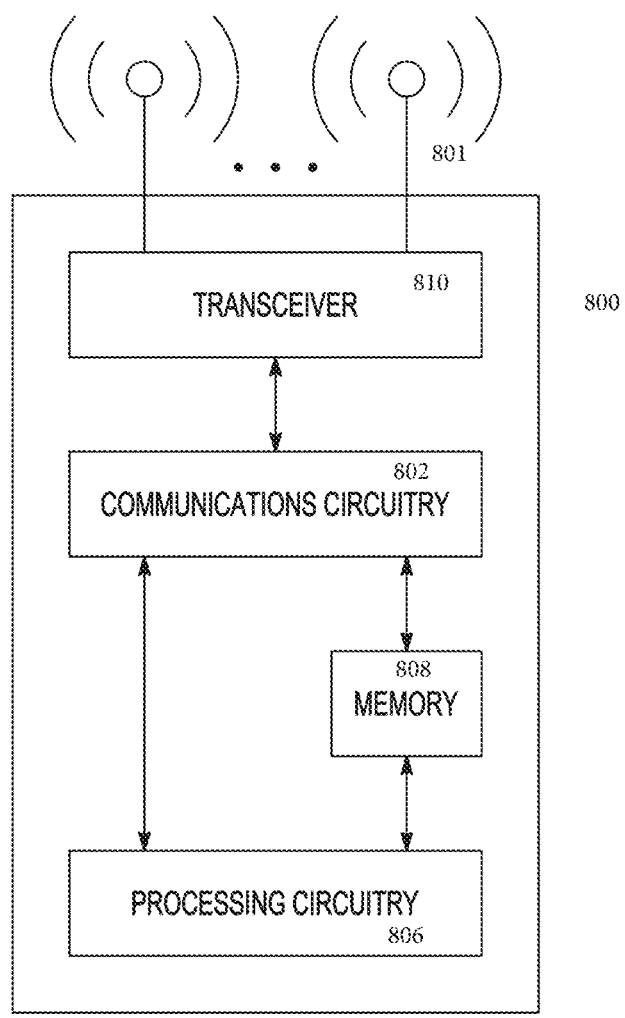
FIG. 8 illustrates a function block diagram of a communication station in accordance with some embodiments.

FIG. 8 illustrates a function block diagram of a communication station in accordance with some embodiments. In some embodiments, communication station may be suitable for use as a user equipment (UE) or a node B (gNB, eNB) configured for operation in a 5G or 6G cellular network. The communication station 800 may also be suitable for use as a handheld device, a mobile device, a cellular telephone, a smartphone, a tablet, a netbook, a wireless terminal, a laptop computer, a wearable computer device, a femtocell, a high data rate (HDR) subscriber station, an access point, an access terminal, or other personal communication system (PCS) device.

The communication station 800 may include communications circuitry 802 and a transceiver 810 for transmitting and receiving signals to and from other communication stations using one or more antennas 801. The communications circuitry 802 may include circuitry that can operate the physical layer (PHY) communications and/or medium access control (MAC) communications for controlling access to the wireless medium, and/or any other communications layers for transmitting and receiving signals. The communication station 800 may also include processing circuitry 806 and memory 808 arranged to perform the operations described herein. In some embodiments, the communications circuitry 802 and the processing circuitry 806 may be configured to perform operations detailed in the above figures, diagrams, and flows.

In accordance with some embodiments, the communications circuitry 802 may be arranged to contend for a wireless medium and configure frames or packets for communicating over the wireless medium. The communications circuitry 802 may be arranged to transmit and receive signals. The communications circuitry 802 may also include circuitry for modulation/demodulation, upconversion/downconversion, filtering, amplification, etc. In some embodiments, the processing circuitry 806 of the communication station 800 may include one or more processors. In other embodiments, two or more antennas 801 may be coupled to the communications circuitry 802 arranged for sending and receiving signals. The memory 808 may store information for configuring the processing circuitry 806 to perform operations for configuring and transmitting message frames and performing the various operations described herein. The memory 808 may include any type of memory, including non-transitory memory, for storing information in a form readable by a machine (e.g., a computer). For example, the memory 808 may include a computer-readable storage device, read-only memory (ROM), random-access memory (RAM), magnetic disk storage media, optical storage media, flash-memory devices and other storage devices and media.

In some embodiments, the communication station 800 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 800 may include one or more antennas 801. The antennas 801 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 800 may include one or more of a keyboard, a display, a non-volatile memory port, multiple antennas, a graphics processor, an application processor, speakers, and other mobile device elements. The display may be an LCD screen including a touch screen.

Although the communication station 800 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 800 may refer to one or more processes operating on one or more processing elements.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus for a generation node B (gNB) configured for operating in a fifth-generation (5G) new radio (NR) network, the apparatus comprising: processing circuitry; and memory, wherein for slot-less operation at frequencies above a 52.6 GHz carrier frequency, the processing circuitry is configured to:

generate signalling to configure a user equipment (UE) with a gap between demodulation reference signal (DMRS) symbols for an associated physical downlink shared channel (PDSCH);

encode the DMRS symbols for transmission in accordance with the gap; and encode the associated PDSCH for transmission, wherein the PDSCH is transmitted during the gap between the DMRS symbol transmissions at symbol times following the DMRS symbols, wherein the memory is configured to store an indication of the gap, wherein the PDSCH comprises a plurality of code block groups (CBGs), and wherein the processing circuitry is further configured to:

encode a physical downlink control channel (PDCCH) for transmission comprising a DCI format that scheduled the PDSCH, the DCI format comprising a starting symbol and length indicator value (SLIV) of a first CBG of the PDSCH, wherein the gap in indicated by the SLIV, wherein the DMRS symbols are encoded for transmission outside the SLIV for each CBG of the PDSCH, and wherein a first of the DMRS symbols are encoded for transmission at a symbol time prior to a first CBG of the PDSCH.

2. The apparatus of claim 1, wherein for DMRS symbols that are allocated inside the SLIV, the DMRS symbols collide with a CBG of the PDSCH.

3. The apparatus of claim 2, wherein when a DMRS symbol is indicated to overlap with a rate-matched resource or a CBG based on the gap and the SLIV, the processing circuitry is configured to shift DMRS symbol transmission to a first data symbol after rate-matched resource or a CBG.

4. The apparatus of claim 3, wherein the rate-matched resource comprises a control resource set (CORESET) for a physical downlink control channel (PDCCH) transmission.

5. The apparatus of claim 1, wherein the gap is configurable to be a uniform gap to provide a same number of PDSCH symbols between DMRS transmissions, and wherein the gap is further configurable to be a non-uniform gap configured by higher-layer signalling, wherein a first gap between first and second DMRS symbols is less than a second gap between the second and a third DMRS symbols.

6. The apparatus of claim 5, wherein the processing circuitry is configured to generate the DMRS based on either a Gold sequence with pi/2 BPSK modulation or a Zadoff-Chu (ZC) sequence.

7. The apparatus of claim 1, wherein the signalling to configure the UE with the gap comprises higher-layer signalling, and wherein the higher-layer signalling comprises radio-resource control (RRC) signalling.

8. The apparatus of claim 7, wherein the processing circuitry is further configured to decode a physical uplink shared channel (PUSCH) received from the UE based on DMRS symbols transmitted by the UE in accordance with the configured gap.

9. A non-transitory computer-readable storage medium that stores instructions for execution by processing circuitry of a generation node B (gNB) configured for operating in a fifth-generation (5G) new radio (NR) network, wherein for slot-less operation at frequencies above a 52.6 GHz carrier frequency, the processing circuitry is configured to:
generate signalling to configure a user equipment (UE) with a gap between demodulation reference signal (DMRS) symbols for an associated physical downlink shared channel (PDSCH);
encode the DMRS symbols for transmission in accordance with the gap; and
encode the associated PDSCH for transmission, wherein the PDSCH is transmitted during the gap between the DMRS symbol transmissions at symbol times following the DMRS symbols,
wherein the PDSCH comprises a plurality of code block groups (CBGs), and
wherein the processing circuitry is further configured to:
encode a physical downlink control channel (PDCCH) for transmission comprising a DCI format that scheduled the PDSCH, the DCI format comprising a starting symbol and length indicator value (SLIV) of a first CBG of the PDSCH,
wherein the gap in indicated by the SLIV,
wherein the DMRS symbols are encoded for transmission outside the SLIV for each CBG of the PDSCH, and
wherein a first of the DMRS symbols are encoded for transmission at a symbol time prior to a first CBG of the PDSCH.

10. The non-transitory computer-readable storage medium of claim 9, wherein for DMRS symbols that are allocated inside the SLIV, the DMRS symbols collide with a CBG of the PDSCH.

11. The non-transitory computer-readable storage medium of claim 10, wherein when a DMRS symbol is indicated to overlap with a rate-matched resource or a CBG based on the gap and the SLIV, the processing circuitry is configured to shift DMRS symbol transmission to a first data symbol after rate-matched resource or a CBG.

12. The non-transitory computer-readable storage medium of claim 11, wherein the rate-matched resource comprises a control resource set (CORESET) for a physical downlink control channel (PDCCH) transmission.

13. The non-transitory computer-readable storage medium of claim 9, wherein the gap is configurable to be a uniform gap to provide a same number of PDSCH symbols between DMRS transmissions, and
wherein the gap is further configurable to be a non-uniform gap configured by higher-layer signalling, wherein a first gap between first and second DMRS symbols is less than a second gap between the second and a third DMRS symbols.

14. An apparatus for a user equipment (UE) configured for operating in a fifth-generation (5G) new radio (NR) network, the apparatus comprising: processing circuitry; and memory,
wherein for slot-less operation at frequencies above a 52.6 GHz carrier frequency, the processing circuitry is configured to:
decode signalling received from a generation node B (gNB) to configure the UE with a gap between demodulation reference signal (DMRS) symbols, the gap spanning a slot boundary, the signalling to schedule transmission of an associated physical downlink shared channel (PDSCH) across the slot boundary;
decode the DMRS symbols received from the gNB in accordance with the gap; and
decode the associated PDSCH, wherein the PDSCH is received across the slot boundary during the gap between the DMRS symbol transmissions at symbol times following the DMRS symbols,
wherein the PDSCH comprises a plurality of code block groups (CBGs), and
wherein the processing circuitry is further configured to:
decode a physical downlink control channel (PDCCH) for transmission comprising a DCI format that scheduled the PDSCH, the DCI format comprising a starting symbol and length indicator value (SLIV) of a first CBG of the PDSCH,
wherein the gap in indicated by the SLIV,
wherein the DMRS symbols are received outside the SLIV for each CBG of the PDSCH, and
wherein a first of the DMRS symbols are received at a symbol time prior to a first CBG of the PDSCH,
wherein for DMRS symbols that are allocated inside the SLIV, the DMRS symbols collide with a CBG of the PDSCH, and
wherein when a DMRS symbol is indicated to overlap with a rate-matched resource or a CBG based on the gap and the SLIV, a DMRS symbol transmission is shifted to a first data symbol after rate-matched resource or a CBG, and
wherein the memory is configured to store an indication of the gap.

* * * * *